(12) United States Patent
Subramaniyam et al.

(10) Patent No.: US 7,263,567 B1
(45) Date of Patent: Aug. 28, 2007

(54) METHOD AND APPARATUS FOR LOWERING THE DIE TEMPERATURE OF A MICROPROCESSOR AND MAINTAINING THE TEMPERATURE BELOW THE DIE BURN OUT

(75) Inventors: Ganesh Subramaniyam, Fort Collins, CO (US); Gary Hammond, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 522 days.

(21) Appl. No.: 09/669,034

(22) Filed: Sep. 25, 2000

(51) Int. Cl.
*G06F 1/00* (2006.01)

(52) U.S. Cl. ............... 710/260; 713/320; 713/324; 710/267

(58) Field of Classification Search ........ 713/300–340; 710/260–269; 327/113
See application file for complete search history.

(56) References Cited

U.S. PATENT DOCUMENTS

| | | |
|---|---|---|
| 4,432,031 A | 2/1984 | Premerlani |
| 4,442,972 A | 4/1984 | Sahay et al. |
| 4,488,824 A | 12/1984 | Salem |
| 4,591,855 A | 5/1986 | Blackburn |
| 4,751,405 A | 6/1988 | Bufano, Jr. et al. |
| 4,779,161 A | 10/1988 | DeShazo, Jr. |
| 4,787,007 A | 11/1988 | Matsumura et al. |
| H562 H | 12/1988 | Trachier et al. |
| 4,789,819 A | 12/1988 | Nelson |
| 4,799,176 A | 1/1989 | Cacciatore |
| 4,807,144 A | 2/1989 | Joehlin et al. |
| RE32,960 E | 6/1989 | Levine |
| 4,851,987 A | 7/1989 | Day |
| 4,903,106 A | 2/1990 | Fukunaga et al. |
| 4,924,112 A | 5/1990 | Anderson et al. |
| 4,935,864 A | 6/1990 | Schmidt et al. |
| 5,008,771 A | 4/1991 | Palara |
| 5,025,248 A | 6/1991 | Bergeron |
| 5,064,296 A | 11/1991 | Huijsing et al. |
| 5,077,491 A | 12/1991 | Heck et al. |
| 5,085,526 A | 2/1992 | Sawtell et al. |
| 5,087,870 A | 2/1992 | Salesky et al. |
| 5,105,366 A | 4/1992 | Beckey |
| 5,125,093 A * | 6/1992 | McFarland ............... 713/300 |
| 5,149,199 A | 9/1992 | Kinoshita et al. |

(Continued)

FOREIGN PATENT DOCUMENTS

EP 0075498 A1 3/1983

(Continued)

OTHER PUBLICATIONS

International Search Report, PCT/US01/29603, Feb. 12, 2002.

(Continued)

*Primary Examiner*—Khanh Dang
*Assistant Examiner*—Raymond N Phan
(74) *Attorney, Agent, or Firm*—Blakely, Sokoloff, Taylor & Zafman LLP

(57) ABSTRACT

According to one embodiment, a method is disclosed. The method includes determining whether the temperature of a central processing unit (CPU) exceeds a predetermined threshold. In addition, the method includes generating a first interrupt if the temperature of the CPU exceeds the predetermined threshold and transitioning from a first execution mode to a second execution mode.

15 Claims, 4 Drawing Sheets

U.S. PATENT DOCUMENTS

| | | | |
|---|---|---|---|
| 5,170,344 A | 12/1992 | Berton et al. | |
| 5,253,938 A | 10/1993 | Stixrud | |
| 5,255,149 A | 10/1993 | Matsuo | |
| 5,283,631 A | 2/1994 | Koerner et al. | |
| 5,287,292 A | 2/1994 | Kenny et al. | |
| 5,291,607 A | 3/1994 | Ristic et al. | |
| 5,325,286 A | 6/1994 | Weng et al. | |
| 5,359,236 A | 10/1994 | Giordano et al. | |
| RE34,789 E | 11/1994 | Fraden | |
| 5,420,808 A * | 5/1995 | Alexander et al. | 713/321 |
| 5,422,832 A | 6/1995 | Moyal | |
| 5,440,305 A | 8/1995 | Signore et al. | |
| 5,451,892 A * | 9/1995 | Bailey | 327/113 |
| 5,453,682 A | 9/1995 | Hinrichs et al. | |
| 5,490,059 A * | 2/1996 | Mahalingaiah et al. | 700/46 |
| 5,560,017 A | 9/1996 | Barrett et al. | |
| 5,625,311 A * | 4/1997 | Nakatsu | 327/293 |
| 5,664,201 A * | 9/1997 | Ikedea | 713/320 |
| 5,719,800 A * | 2/1998 | Mittal et al. | 713/321 |
| 5,752,001 A * | 5/1998 | Dulong | 703/2 |
| 5,805,907 A * | 9/1998 | Loper et al. | 713/300 |
| 5,838,578 A * | 11/1998 | Pippin | 364/488 |
| 5,870,616 A * | 2/1999 | Loper et al. | 713/324 |
| 5,948,105 A * | 9/1999 | Skurnik et al. | 713/323 |
| 5,978,864 A * | 11/1999 | Hetherington et al. | 710/18 |
| 5,996,084 A * | 11/1999 | Watts | 713/323 |
| 6,006,168 A * | 12/1999 | Schumann et al. | 702/132 |
| 6,112,164 A * | 8/2000 | Hobson | 702/132 |
| 6,138,232 A * | 10/2000 | Shiell et al. | 712/244 |
| 6,219,795 B1 * | 4/2001 | Klein | 713/300 |
| 6,789,037 B2 * | 9/2004 | Gunther et al. | 702/132 |

FOREIGN PATENT DOCUMENTS

| | | | |
|---|---|---|---|
| EP | 0 566 395 A1 * | 4/1993 | |
| EP | 0551090 A2 | 7/1993 | |
| EP | 0566395 A1 | 10/1993 | |
| EP | 0 683 558 A1 * | 5/1995 | |
| EP | 0683558 A1 | 11/1995 | |
| EP | 0851336 A1 | 7/1998 | |
| EP | 0926596 A2 | 6/1999 | |

OTHER PUBLICATIONS

Salminen et al., "The Higher Order Temperature Compensation of Bandgap Voltage References," 1992 IEEE, Helsinki University of Technology, pp. 1388-1391.

Allen et al., "CMOS Analog Circuit Design," HRW, 1987, pp. 520-551.

Chin et al., "A New Type of Curvature-Compensated CMOS Bandgap Voltage References," IEEE, 1991, pp. 398-402.

Ferro et al., "A Floating CMOS Bandgap Voltage Reference for Differential Applications," IEEE, 1992, pp. 690-697.

* cited by examiner

US 7,263,567 B1

METHOD AND APPARATUS FOR LOWERING THE DIE TEMPERATURE OF A MICROPROCESSOR AND MAINTAINING THE TEMPERATURE BELOW THE DIE BURN OUT

FIELD OF THE INVENTION

The present invention relates to computer systems; more particularly, the present invention relates to lowering and maintaining the temperature of a microprocessor die below a burnout temperature.

BACKGROUND

Throughout the history of microcomputers there has been a motivation to increase the performance of microprocessors. However, with the constant increase in microprocessor performance, there is typically an increase in the magnitude of power consumed by the microprocessor. Due to the increase in power consumption, the run time temperature of the die of a microprocessor may exceed a safe threshold value.

Various methods currently exist to reduce the run time temperature of microprocessors. One such method is to modulate the processor clock. Another method is to modulate the processor clock frequency. However, these methods complicate the hardware design implementation, validation and also decrease the performance of a microprocessor. Yet another solution for cooling the run time temperature of a microprocessor is to shut down the microprocessor and reboot the computer system at a later time. However having to shut down the computer is obviously disadvantageous as it increases the down time of the system. Therefore, it would be advantageous to develop a more efficient method of maintaining the run time temperature of a microprocessor.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus for maintaining the temperature of a microprocessor is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
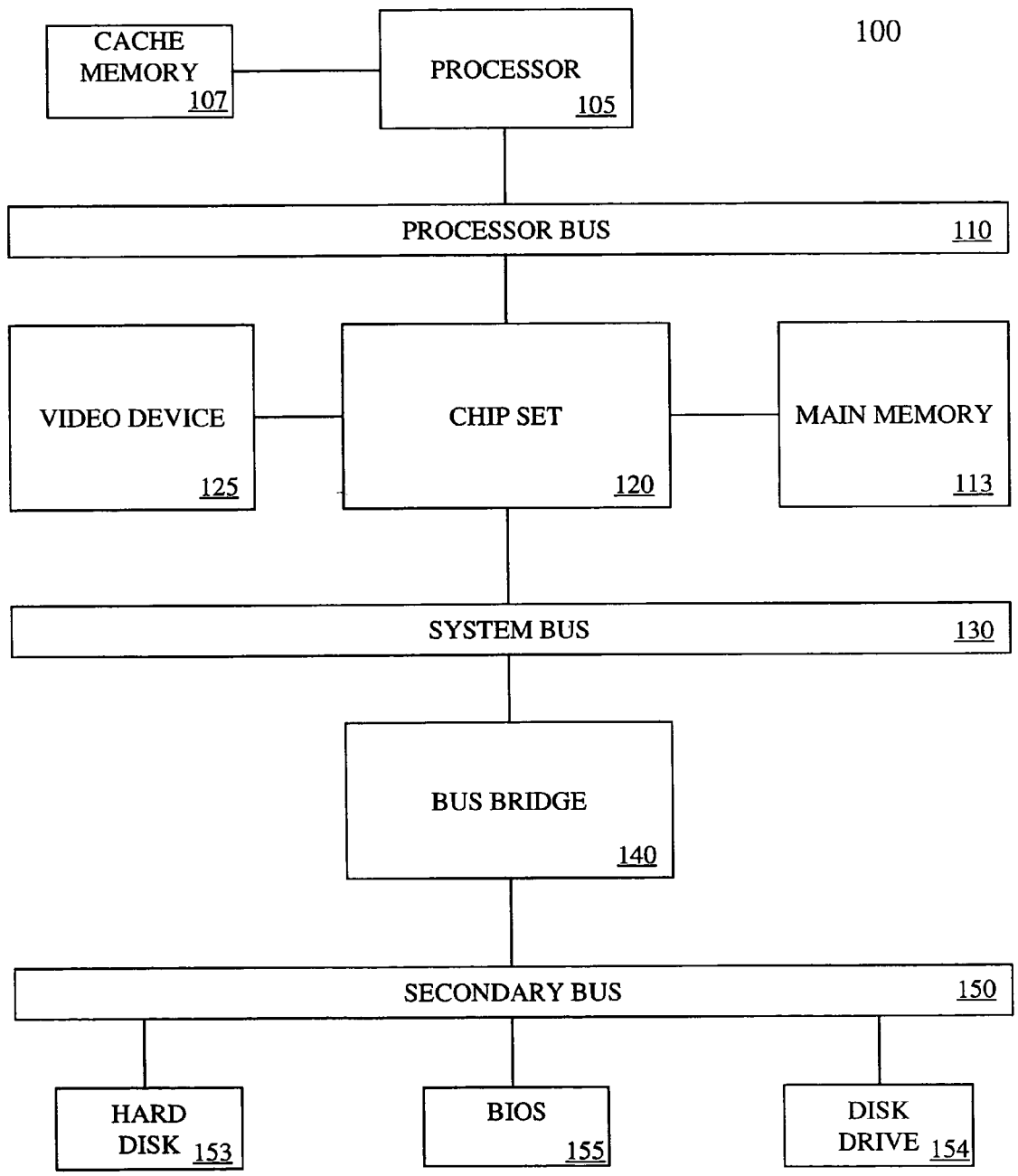
FIG. 1 is a block diagram of one embodiment of a computer system.

FIG. 1 is a block diagram of one embodiment of a computer system 100. Computer system 100 includes a central processing unit (processor) 105 coupled to processor bus 110. In one embodiment, processor 105 is a processor in the Pentium® family of processors including the Pentium® II family and mobile Pentium® and Pentium® II processors available from Intel Corporation of Santa Clara, Calif. Alternatively, other processors may be used. Processor 105 may include a first level (L1) cache memory (not shown in FIG. 1).

According to one embodiment, processor 105 operates in either a full dispersal mode or a single dispersal mode. In the full dispersal mode, processor 105 executes multiple instructions at a time. According to one embodiment, processor 105 executes six instructions at a time. In the single dispersion mode, processor 105 executes one instruction at a time. According to a further embodiment, processor 105 transitions from the full dispersion mode to the single dispersion mode upon the die temperature of processor 105 exceeding a predetermined temperature threshold.

In yet a further embodiment, processor 105 operates according to an artificial activity mode. The artificial activity mode minimizes current spikes (e.g., $$\frac{di}{dt}$$

spikes) within processor 105 by maintaining a minimum level of activity within processor 105. For example, if the activity (e.g., instructions received and/or executed) falls below a predetermined threshold, simulated instructions are received at processor 105 for processing. The simulated instructions may be received from the L1 cache memory, a floating point unit, integer unit or any other device within processor 105 or computer system 100. The results of the simulated instructions are disregarded after processing. According to one embodiment, the minimum level of activity within processor 105 is seventy percent of processor 105 capacity. However in other embodiments, the minimum level of activity within processor 105 may be other percentages of processor 105 capacity.

In one embodiment, processor 105 is also coupled to cache memory 107, which is a second level (L2) cache memory, via dedicated cache bus 102. The L1 and L2 cache memories can also be integrated into a single device. Alternatively, cache memory 107 may be coupled to processor 105 by a shared bus. Cache memory 107 is optional and is not required for computer system 100.

Chip set 120 is also coupled to processor bus 110. In one embodiment, chip set 120 is the 440BX chip set available from Intel Corporation; however, other chip sets can also be used. Chip set 120 may include a memory controller for controlling a main memory 113. Further, chipset 220 may also include an Accelerated Graphics Port (AGP) Specification Revision 2.0 interface 320 developed by Intel Corporation of Santa Clara, Calif. AGP interface 320 is coupled to a video device 125 and handles video data requests to access main memory 113.

Main memory 113 is coupled to processor bus 110 through chip set 120. Main memory 113 and cache memory 107 store sequences of instructions that are executed by processor 105. The sequences of instructions executed by processor 105 may be retrieved from main memory 113, cache memory 107, or any other storage device. Additional devices may also be coupled to processor bus 110, such as multiple processors and/or multiple main memory devices. Computer system 100 is described in terms of a single processor; however, multiple processors can be coupled to processor bus 110. Video device 125 is also coupled to chip set 120. In one embodiment, video device 125 includes a video monitor such as a cathode ray tube (CRT) or liquid crystal display (LCD) and necessary support circuitry.

Processor bus 110 is coupled to system bus 130 by chip set 120. In one embodiment, system bus 130 is a Peripheral Component Interconnect (PCI) bus adhering to a Specification Revision 2.1 bus developed by the PCI Special Interest Group of Portland, Oreg.; however, other bus standards may also be used. Multiple devices, such as audio device 127, may be coupled to system bus 130.

Bus bridge 140 couples system bus 130 to secondary bus 150. In one embodiment, secondary bus 150 is an Industry Standard Architecture (ISA) Specification Revision 1.0a bus developed by International Business Machines of Armonk, N.Y. However, other bus standards may also be used, for example Extended Industry Standard Architecture (EISA) Specification Revision 3.12 developed by Compaq Computer, et al. Multiple devices, such as hard disk 153 and disk drive 154 may be coupled to secondary bus 150. Other devices, such as cursor control devices (not shown in FIG. 1), may be coupled to secondary bus 150.

According to one embodiment, a basic input output system (BIOS) 155 is coupled to secondary bus 150. BIOS 155 includes arrays of programmable AND gates and predefined OR gates that store a set of routines which provide an interface between the operating system and components of computer system 100. According to one embodiment, BIOS 155 transmits signals to processor 105 to initiate the generation of artificial activity at processor 105. In one embodiment, BIOS 155 is programmable array logic (PAL). However, one of ordinary skill in the art will appreciate that other devices may be used to implement BIOS 155.

Figure 2:
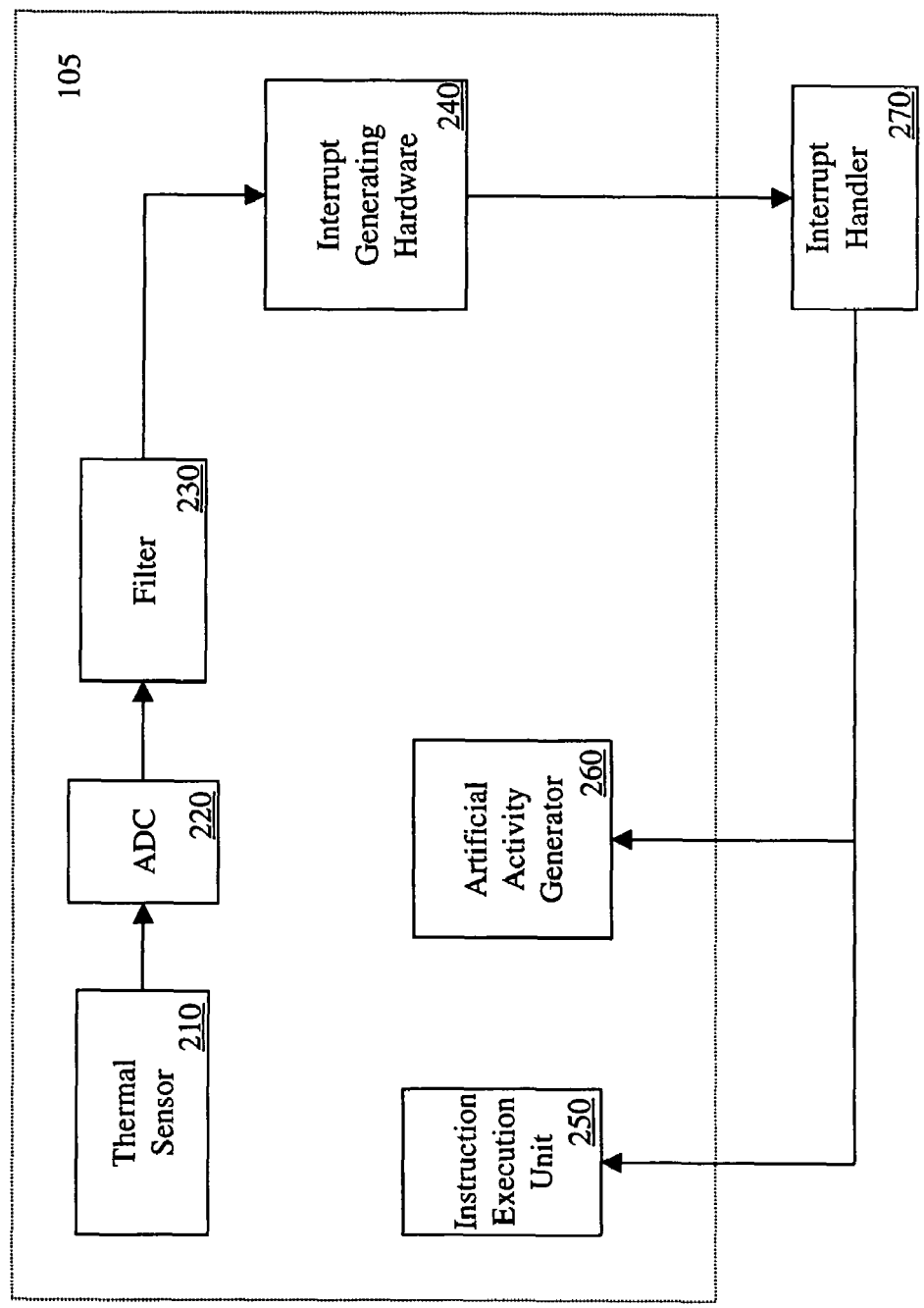
FIG. 2 is a block diagram of one embodiment of a microprocessor.

According to one embodiment, processor 105 includes power management logic to prevent prolonged operation at excess temperatures. During the run time of computer system 105, the power consumed at processor 105 may exceed 130 watts. Such power consumption may cause processor 105 to overheat and lead to the eventual burnout of processor 105. FIG. 2 is a block diagram of one embodiment of temperature monitoring logic within processor 105.

Referring to FIG. 2, processor 105 includes a thermal sensor 210, an analog to digital converter (ADC) 220, a filter 230, interrupt generating hardware 240, instruction execution unit 250, and artificial activity generator 260. In addition, processor 105 is coupled to an interrupt handler 270. According to one embodiment, sensor 210 is an analog sensor that continuously monitors the temperature of processor 105 during the operation of computer system 100. ADC 220 is coupled to sensor 210 and converts an analog temperature value received from sensor 210 to a one-bit digital signal.

According to one embodiment, ADC 220 transmits a low logic level (e.g., logic 0) if the temperature value received is below a predetermined threshold and transmits a high logic level (e.g., logic 1) if the temperature value is above the predetermined threshold. One of ordinary skill in the art will appreciate that the combination of sensor 210 and ADC 220 may be replaced by a digital sensor in other embodiments.

Filter 230 is coupled to ADC 220. Filter 230 is a digital filter that removes temperature noise conditions for a predetermined number of clock cycles. According to one embodiment, filter 230 determines how long the die temperature is above or below the predetermined threshold before initiating a high temperature or normal temperature interrupt, respectively. According to a further embodiment, digital filter 230 removes noise conditions for two clock cycles. In yet a further embodiment, the number of predetermined clock cycles may be programmed into digital filter 230.

Interrupt generating hardware 240 is coupled to filter 230. Interrupt generating hardware 240 generates a high temperature (HITEMP) interrupt upon the die temperature of processor 105 exceeding the predetermined threshold temperature, subject to the operations of filter 230. In addition, interrupt generating hardware 240 generates a normal temperature (NORMTEMP) interrupt upon the die temperature of processor 105 cooling below the predetermined threshold temperature. In one embodiment, a high logic level is transmitted by interrupt generating hardware 240 as the HITEMP interrupt. Further, a low logic level is transmitted by interrupt generating hardware 240 as the NORMTEMP interrupt. One of ordinary skill in the art will recognize that the operation of ADC 220 may be reversed.

Instruction execution unit 250 determines the dispersal mode in which processor 105 operates. In one embodiment, instruction execution unit 250 causes processor 105 to operate in the full dispersal mode whenever the die temperature is below the predetermined threshold temperature. Conversely, execution unit 250 causes processor 105 to operate in the single dispersal mode whenever the die temperature is above the predetermined threshold temperature.

Artificial activity generator 260 controls the artificial activity within processor 105. As described above, an artificial activity mode minimizes current spikes within processor 105 by maintaining a minimum level of activity. Artificial activity generator 260 determines the level of artificial activity that is generated at processor 105. According to one embodiment, artificial activity generator suspends artificial activity within processor 105 whenever the die temperature is above the predetermined threshold temperature.

Interrupt handler 270 is coupled to interrupt generating hardware 240, instruction execution unit 250 and artificial activity generator 260. In one embodiment, interrupt handler 270 receives the processor level interrupts HITEMP and NORMTEMP and causes the appropriate action to be taken. For example, upon receiving the HITEMP interrupt, interrupt handler 270 transmits a signal to instruction execution unit 250 causing processor 105 to transition from the full dispersal mode to the single dispersal mode. By placing processor 105 in the single dispersal mode, the utilization of components within processor 105 is reduced, resulting in the cooling of temperature within processor 105. Similarly, interrupt handler 270 causes processor 105 to transition back to the full dispersal mode upon receiving the NORMTEMP interrupt.

Further, interrupt handler 270 transmits signals to artificial activity generator to suspend and resume artificial activity depending upon the die temperature. According to one embodiment, interrupt handler 270 resides within BIOS 155. In a further embodiment, interrupt handler 270 may resides in main memory 113 upon startup of computer system 100. However, one of ordinary skill in the art will appreciate that interrupt handler 270 may be located elsewhere within computer system 100.

Figure 3A:
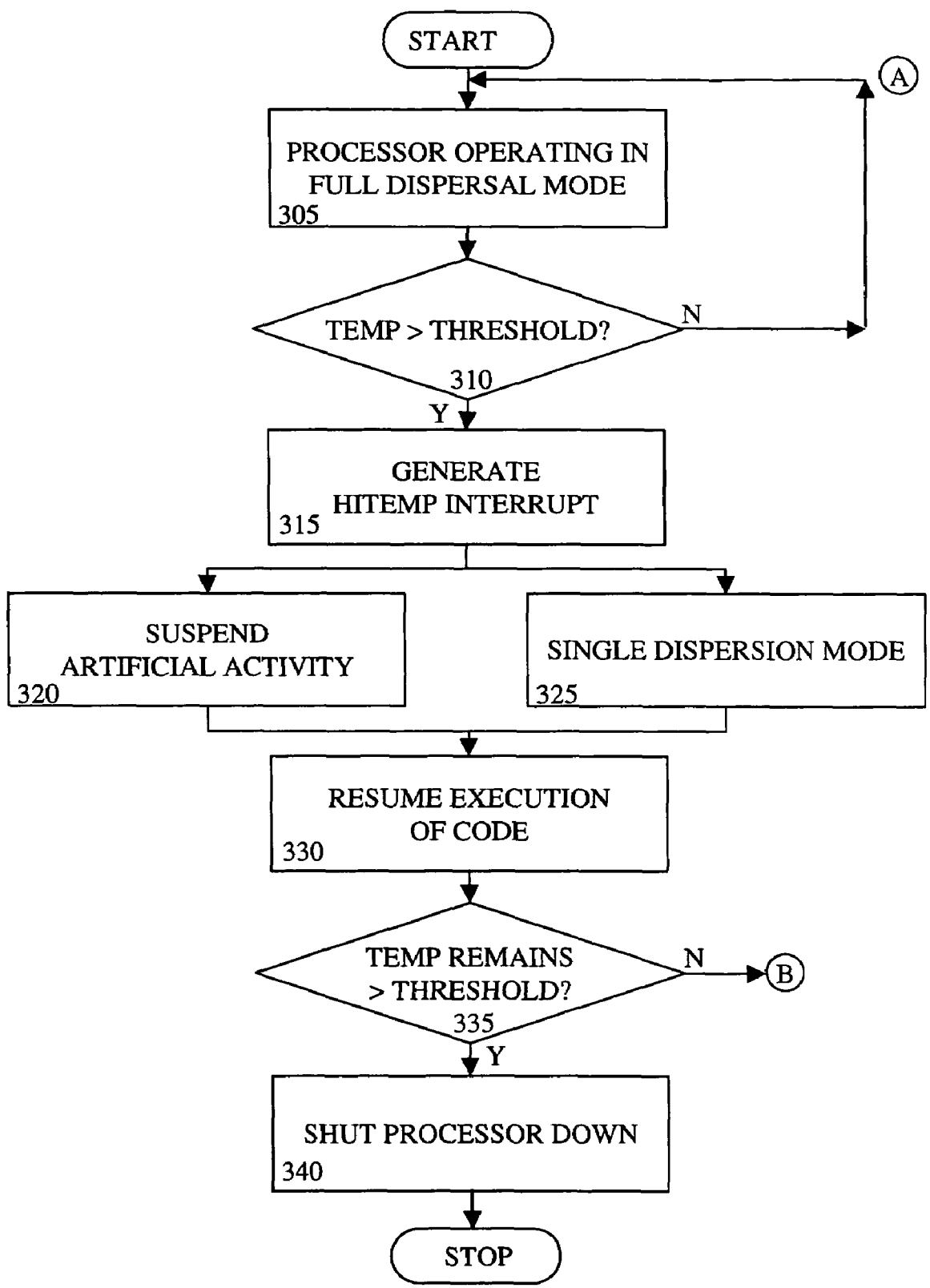
FIG. 3 is a flow diagram for one embodiment of controlling the temperature of a microprocessor.
Figure 3B:
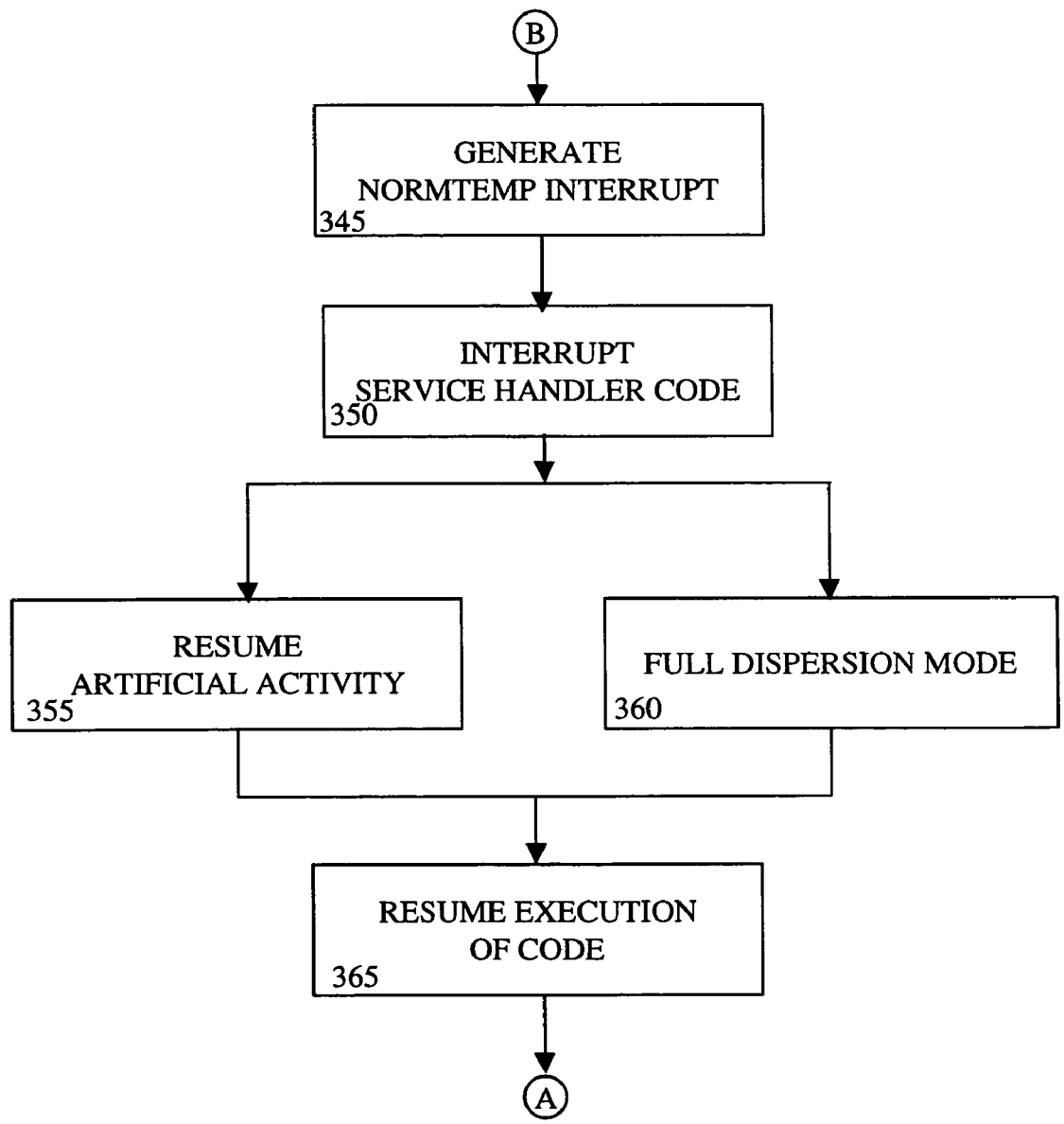

FIG. 3 is a flow diagram for one embodiment of controlling the temperature of processor 105. At process block 305, processor 105 is operating in the full dispersal mode. As described above, the full dispersal mode features executing instruction streams at very high processor 105 utilization. At process block 310, it is determined whether the die temperature of processor 105 has exceeded the predetermined threshold. If the die temperature has not exceeded the predetermined threshold, control is returned to process block 305.

However, if the die temperature has exceeded the predetermined threshold, the HITEMP interrupt is generated at ADC 220, process block 315. According to one embodiment, the execution of code within processor 105 is temporarily suspended after the HITEMP interrupt is generated. At process block 320, interrupt handler 270 causes processor 105 to cease operation in the artificial activity mode. By stopping artificial activity, processor 105 is permitted to fall below the predetermined minimum level of activity.

In addition, at process block 325, interrupt handler 270 causes processor 105 to transition from the full dispersal mode to the single dispersal mode. At process block 330, the execution of code within processor 105 continues in the single dispersion mode from the point at which it was suspended. As described above, the single dispersal mode clamps the maximum utilization of components within processor 105. As a result, the power consumed by processor 105 is limited. At process block 335, it is determined whether the die temperature of processor 105 continues to remain above the predetermined temperature threshold. If the temperature remains above the predetermined threshold, processor 105 is shut down, process block 340.

If, however, the die temperature of processor 105 falls below the predetermined threshold, the NORMTEMP interrupt is generated, process block 345. The execution of code within processor 105 is temporarily suspended after the NORMTEMP interrupt is generated. At process block 350, interrupt service handler code within interrupt handler service 270 causes processor 105 to commence operation in the artificial activity mode. In addition, at process block 355, interrupt handler 270 causes processor 105 to transition from the single dispersal mode to the full dispersal mode. At process block 360, interrupt handler 270 causes the execution of code within processor 105 to continue in the full dispersion mode from the point at which it was suspended.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A system comprising:
    a central processing unit (CPU);
    power management logic within the CPU to enable the CPU to execute a first quantity of instructions per cycle whenever the temperature of the CPU exceeds a predetermined threshold and to execute a second quantity of instructions per cycle whenever the temperature of the CPU is below the predetermined threshold;
    an artificial activity generator within the power management logic to generate artificial activity within the CPU whenever the temperature of the CPU is below the predetermined threshold to minimize current spikes within the CPU, the artificial activity being simulated instructions for the CPU; and
    programmable array logic (PAL) coupled to the CPU to operate as an interrupt handler to control the CPU upon receiving an interrupt from the power management logic indicating that temperature of the CPU is at least one of above or below the predetermined threshold.

2. The system of claim 1 wherein the power management logic comprises:
    a thermal sensor;
    a digital filter coupled to the thermal sensor; and
    an interrupt generating hardware coupled to the digital filter, wherein the interrupt generating hardware generates a first interrupt whenever the temperature of the CPU exceeds the predetermined threshold and generates a second interrupt whenever the temperature of the CPU is below the predetermined threshold.

3. The system of claim 1 wherein the power management logic further comprises an instruction execution unit coupled to the interrupt handler.

4. The system of claim 2 wherein the power management logic further comprises an analog to digital converter coupled between the thermal sensor and the digital filter.

5. The system of claim 3 wherein the artificial activity generator suspends the artificial activity within the CPU whenever the die temperature is above the predetermined threshold temperature.

6. A method comprising:
    determining whether the temperature of a central processing unit (CPU) exceeds a predetermined threshold, and if so:
        generating a high temperature interrupt;
        receiving the high temperature interrupt at programmable array logic (PAL), wherein the PAL controls the CPU upon receiving the interrupt;
        transmitting a signal to the CPU indicating a first quantity of instructions per cycle; and
        executing the first quantity of instructions per cycle if the temperature of the CPU continues to exceed the predetermined threshold; and
    determining whether the temperature of the CPU falls below the predetermined threshold, and if so:
        generating a normal temperature interrupt;
        receiving the normal temperature interrupt at the PAL;
        transmitting a signal to the CPU indicating a second quantity of instructions per cycle;
        executing the second quantify of instructions if the temperature of the CPU remains below the predetermined threshold; and
        entering an artificial activity mode to generate artificial activity within the CPU while the temperature of the CPU is remains below the predetermined threshold in order to minimize current spikes within the CPU, the artificial activity being simulated instructions for the CPU.

7. The method of claim 6 further comprising:
    interrupting the artificial activity mode; and
    transitioning from a full instruction execution mode to a single instruction execution mode.

8. The method of claim 7 further comprising:
    suspending the execution of code at the CPU after generating the high temperature interrupt; and
    resuming the execution of code at the CPU after transitioning to the single instruction execution mode.

9. The method of claim 8 further comprising:
determining whether the temperature of the CPU exceeds the predetermined threshold after transitioning to the single instruction execution mode; and
terminating the operation of the CPU if the temperature of the CPU exceeds the predetermined threshold after transitioning to the single instruction execution mode.

10. The method of claim 8 further comprising:
determining whether the temperature of the CPU exceeds the predetermined threshold after transitioning to the single instruction execution mode; and
generating a second interrupt if the CPU does not exceed the predetermined threshold after transitioning to the single instruction execution mode.

11. The method of claim 10 further comprising transitioning from the second execution mode to the first execution mode.

12. The method of claim 11 wherein the process of transitioning from the second execution mode to the first execution mode comprises:
resuming the artificial activity mode; and
transitioning from the single instruction execution mode to the full instruction execution mode.

13. A central processing unit (CPU) comprising:
a thermal sensor;
an instruction execution unit to:
receive a first signal from programmable array logic (PAL) indicating execution of a first quantity of instructions per cycle in a first execution mode whenever the thermal sensor indicates a temperature of the CPU exceeds a predetermined threshold; and
receive a second signal from the PAL indicating execution of a second quantity of instructions per cycle in a second execution mode whenever the thermal sensor indicates the temperature of the CPU falls below the predetermined threshold; and
an artificial activity generator to generate artificial activity within the CPU whenever the temperature of the CPU falls below the predetermined threshold to minimize current spikes within the CPU, the artificial activity being simulated instructions for the CPU.

14. The CPU of claim 13 further comprising interrupt generating hardware to generate a first interrupt whenever the thermal sensor measures a temperature that exceeds the predetermined threshold and to generate a second interrupt whenever the thermal sensor measures a temperature below the predetermined threshold.

15. The CPU of claim 13 wherein the artificial activity generator suspends artificial activity within the CPU whenever the die temperature is above the predetermined threshold temperature.

* * * * *